Jan. 21, 1969  C. C. CONNELL  3,422,790
MULTIENGINE DRIVE ARRANGEMENT

Filed Nov. 14, 1966  Sheet 1 of 2

INVENTOR.
CALVIN C. CONNELL
BY *Edward M. Hunter*
ATTORNEY

Jan. 21, 1969 C. C. CONNELL 3,422,790
MULTIENGINE DRIVE ARRANGEMENT
Filed Nov. 14, 1966 Sheet 2 of 2
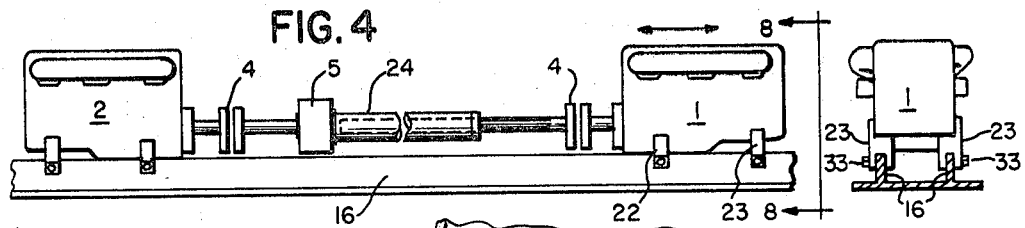
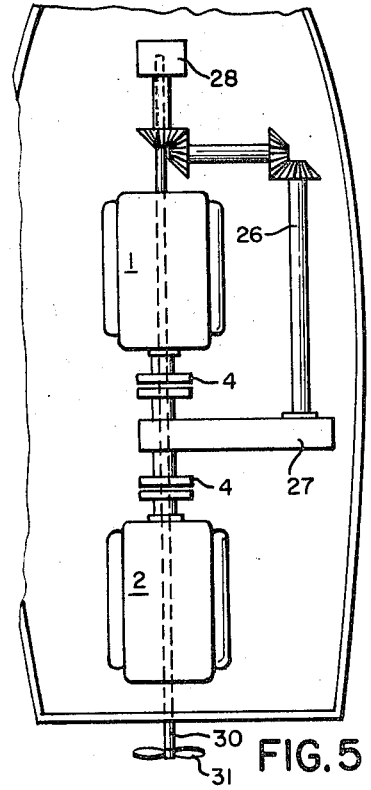
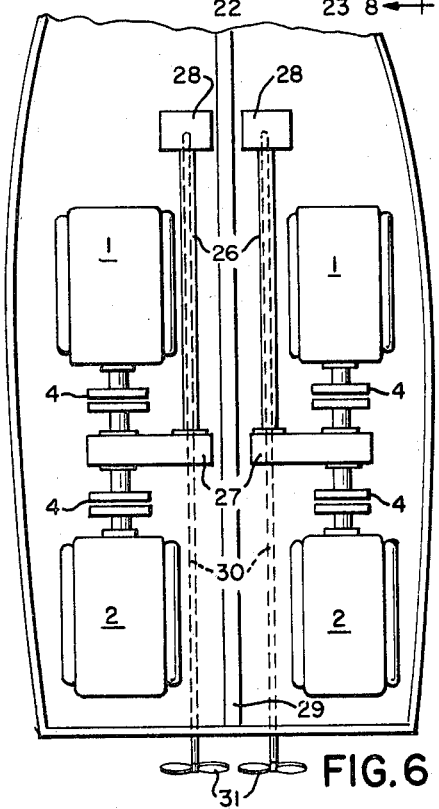
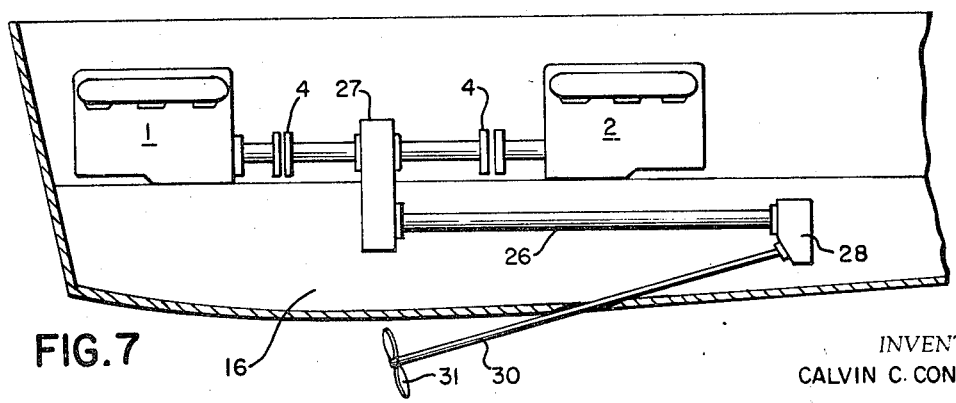
INVENTOR.
CALVIN C. CONNELL
BY *Edward M. Steutermann*
ATTORNEY 3,422,790
MULTIENGINE DRIVE ARRANGEMENT
Calvin C. Connell, 800 S. 4th St., Louisville, Ky. 40202
Filed Nov. 14, 1966, Ser. No. 601,269
U.S. Cl. 115—37                                     5 Claims
Int. Cl. B63h 5/08, 23/10

ABSTRACT OF THE DISCLOSURE

An arrangement for mounting multiple engines in a boat hull where at least two of the engines are disposed in aligned relation along a longitudinal line in the hull which line is generally parallel to the longitudinal axis of the hull.

---

Previous motor driven boats having two or more engines therein have included inboard engines in side by side relation, each engine having one screw propellor and said engines being separated by a considerable distance and the individual screw propellors being separated by a corresponding distance. In such previous motor driven boats failure of one engine causes the boat to experience a severe sidewise thrust since the screw propellor, and therefore, the line of force, is some distance from the center line of the boat. This in turn causes a strain on the operating engine and steering is thereby complicated.

In addition, the removal of one of two engines which are in side by side relation causes the weight distribution in said boat to become uneven and renders the boat useless unless a counterbalancing weight is applied.

In previous motor driven boats, where the engines are fixed in the hull of the boat, any load the boat carries must be distributed to the best advantage throughout the hull in order to obtain adequate performance during operation of the boat. Also permanently fixing the position of the engines in a boat hull adversely affects the efficiency of the boat by restricting optimum operation to usually one range of speed. For example, for a particular design a boat hull will operate at its maximum efficiency with the engines, or motors, in one particular position for fast speed and another particular different position for a slower or cruising speed. If the engines are restricted to one location in the hull a choice must be made whether the boat will be designed to operate at maximum at low speed or at high speed.

It is an object of this invention, therefore, to provide a multi-engine drive arrangement where a plurality of engines, or motors, are disposed within a boat hull to provide the best dynamic and static center of gravity.

Another object of this invention is to provide a drive arrangement wherein the propellor means can be located so that the failure of one engine will not create a moment of force so as to tend to make steering difficult.

Another object of this invention is to provide a drive arrangement whereby one of two or more engines can selectively operate two or more driving mechanisms.

A further object of this invention is to provide a more compact motor and drive arrangement so that the deck line of a boat may be as low as possible.

Another object of this invention is to provide a drive arrangement whereby one engine may be disconnected from the driving arrangement and not affect the operation of the boat and, furthermore, to provide an arrangement whereby one of the engines can be removed from the boat hull without adversely affecting the balance or operation of the boat.

A further object of this invention is to provide a means for mounting a plurality of engines, or motors, of different size and weight in a boat without requiring complicated manipulation to provide a proper balance along the center line of the boat.

Other objects will occur to those skilled in the art from the detailed description, which follows herein.

Basically the invention comprises two or more engines in tandem disposed in aligned relation along a longitudinal line of the hull in such a manner to provide for the longitudinal movement of each of said engines within the hull. Said engines are connected to a power train, which transmits power to the selected propulsion means to move the boat.

Referring now to the figures:

FIG. 4 is a side view showing one engine moveably mounted on motor stringers.

FIG. 5 is a plan view of an alternate drive arrangement.

FIG. 6 is a plan view of another alternate drive arrangement.

FIG. 7 is a side view of an alternate drive arrangement.

FIG. 8 shows an end view of FIG. 4.

The figures show, in general, examples of motor mounting arrangements in accordance with the present invention wherein two engines are mounted in lined relationship along a longitudinal axis, which can be the center line of the boat hull. In the figures the same reference numbers refer to similar elements in the different figures.

Figure 1:
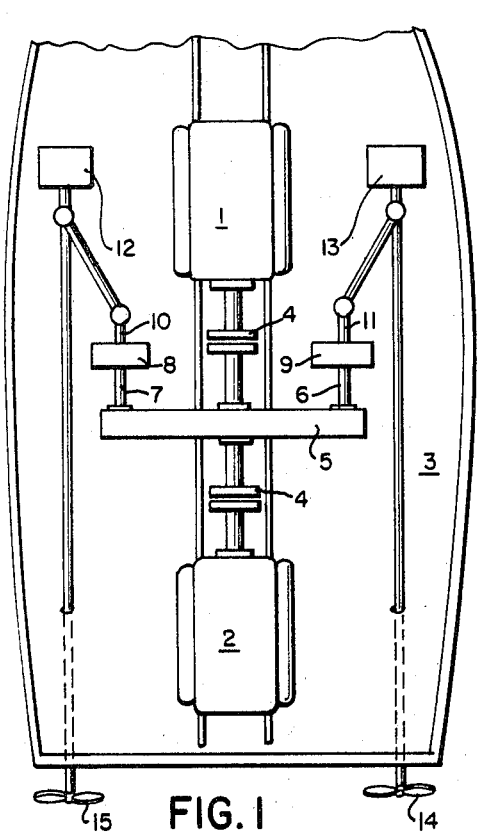
FIG. 1 is a plan view showing the arrangement of motors in a boat hull in accordance with the present invention.

Referring now to the drawings, FIG. 1 shows a plan view of one embodiment of my invention. V-drives 12 and 13, common in the industry, are shown in FIG. 1. Engines 1 and 2 are disposed along the center line of a hull 3, flywheel to flywheel, each containing a dog clutch 4 transmitting power into a common power train, or gear train 5. Output shafts 6 and 7 are connected to gear train 5 and running from gear train 5 to marine transmissions 8 and 9. Output shafts 10 and 11 from the marine transmissions then being universally joined to V-drives 12 and 13, which are well known in the industry. The said V-drive transmitting power to propellors 14 and 15.

As is well known in the industry a V-drive can be angled and installed in a boat hull so that the propellor will be located a selected distance from the central axis of the boat hull. It has been recognized that the present invention provides an arrangement to greatly increase the latitude in selecting the disposition of the propellor relative to the axis of the boat hull. Further in accordance with the engine arrangement provided by the present invention the propellor can be adjacent to the center line of the boat so that the distance from the center line to the propellor is at a minimum or, as far outboard as the hull of the boat will allow. Using two propellors as shown in FIG. 1, in which the propellors are located as close to the center line of the boat as possible, a failure of one propellor would not exert a moment of force on the boat tending to throw the boat to one side or the other. (For clarity the propellors are shown some distance from the center line of the boat hull in FIG. 1.)

As can be seen from FIG. 1 the use of the dog clutches 4 enables either engine 1 or engine 2 to individually operate both propellors. This ability provides numerous advantages, specifically in speed control waters or where trolling is desirable one engine can be used to cruise at the required speed. Also one engine can be used to move the boat either forward or backward by the use of the marine transmissions. In addition, one engine can be used to operate both propellors simultaneously in either the forward, neutral or reverse positions, or in the alternative, simultaneously one propellor in reverse and one propellor in the forward position or in the neutral position, at the operator's discretion.

A very important ability and advantage of this type of arrangement is the use of one engine to drive the boat and the remaining engine for other purposes, such as a power source to operate compressors for refrigeration, or winches or to operate generators for electricity, when not used as a populsion source.

It is to be understood that the above description is not by means of limitation and that the output shafts may be connected to V-drives, out drives, jet drives, angle drives and other drives familiar to those in the industry.

It is also to be understood that the marine transmissions may be either hydraulically, mechanically or electrically operated.

Figure 3:
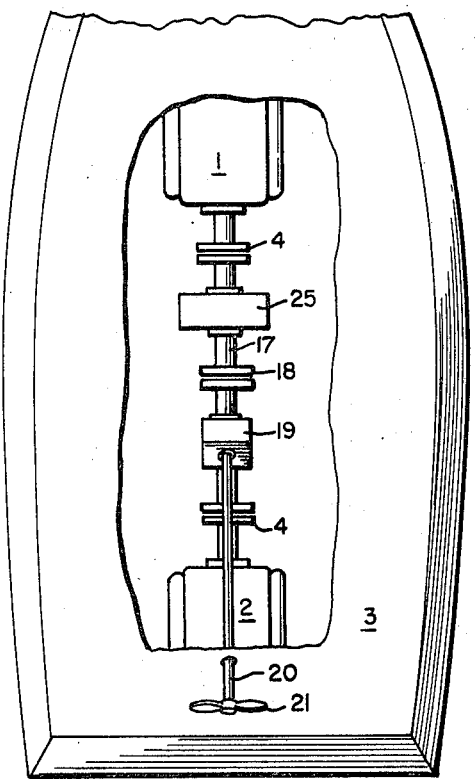
FIG. 3 is a view showing the under side of the FIG. 2 arrangement with part of the hull cut away.
Figure 2:
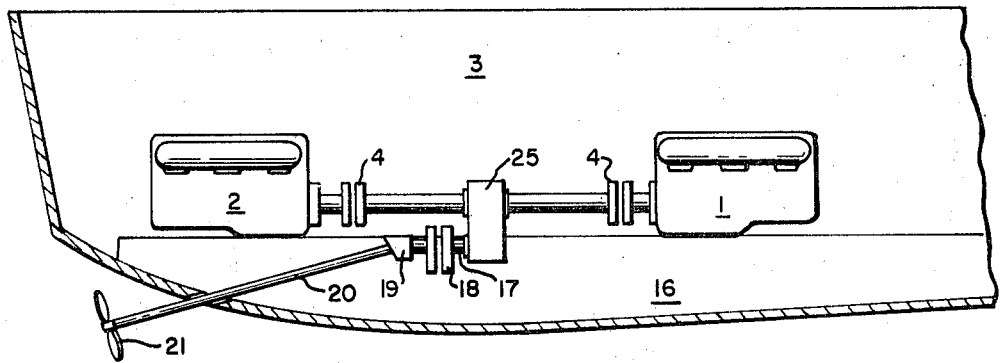
FIG. 2 is a sectional view of another example of an arrangement of engines in a boat hull.

FIG. 2 shows another example of an arrangement in accordance with the present invention where engines 1 and 2 can be mounted on motor stringers 16, for movement along the stringer to provide the desired balance for the boat hull. The stringers can, advantageously be disposed along the longitudinal axis of the boat hull. Engines 1 and 2 are connected to a power train 25 having an output shaft 17. Output shaft 17 can include another clutch 18 and can provide power to an angle drive 19 of the type known in the industry. The drive shaft 20 transmits power from the angle drive 19 to propellor 21. As can be seen in FIG. 3 this arrangement allows two engines to power one propellor, if desired. It is also possible that two output shafts can be powered from a common power train as in FIG. 1 and through appropriate clutches be attached to two angle drives, out drives or jet drives.

FIG. 4 shows the engines mounted on the motor stringers 16 wherein engine 2 is in a fixed position and engine 1 is moveably attached to the motor stringers 16 by clamping means 22 and 23, for example C-clamps or pin type locking arrangements. An end view of the engine 1 mounted on the motor stringers 16 is shown in FIG. 8. A pin type locking arrangement is shown wherein mounting means 23 rests on the motor stringers 16 and are secured to the motor stringers 16 by pins 33. There are many other arrangements within the scope of the present invention which will be apparent to one skilled in the art. The output shaft, or drive shaft 24, can be of the internal spline type or some similar means whereby engine 1 can be moved along the said motor stringers 16.

The engine 1 may be moved hydraulically, mechanically or electrically. This advantage allows the weight distribution in the boat hull to be made to obtain the best static and dynamic buoyancy and by judicious use of V-drives or angle drives will obtain the best shaft angle possible to operate the boat at the maximum efficiency.

For example, this application would be quite useful in the commercial fishing field where a gill-net boat, empty, can move its weight aft for good high speed performance so it can rapidly dispatch itself to the fishing area. After the hull has been filled with fish, the engine weight can be shifted to keep the hull in balance in keeping with its best planing angle for that given weight and power.

FIG. 5 shows an alternate embodiment of the present invention in which the output shaft 26 can extend along one side of engine 1 forward from the power train 27 so that it can be joined to a V-drive 28 located forward of both engines and along the same axis as the engines.

FIG. 6 shows a variation where four engines may be used wherein the engines can be disposed in pairs, flywheel to flywheel, in an outboard position and the output shaft 26, angle drive 28, propellor shaft 30 and propellor 31 can be disposed immediately adjacent to the keel or center line 29 of the boat hull.

FIG. 7 shows how the drive shaft 26 can be disposed below the engines and between the motor stringers 16.

There are many other advantages of this type of engine arrangement and power train arrangement. For example, the hull may be totally finished with the installation of the power train, V-drives or angle drives, shafts, clutches, etc. and then at the option of the builder the power source can be installed that he requires for the purpose of the boat.

In the application of this invention to deep V-hull designs the roll center of the boat will be as low as possible since the engines may be placed in tandem and not in side by side relationship. This ability to place the engines in tandem also permits the lowering of the deck line considerably over the standard application of placing the engines in side by side relationship.

It will be noted that since the two engines are separated from the power train with clutches, in the examples of FIG. 1, it is possible to operate both propellors with only one engine engaged so that the other engine can be operated to perform additional jobs at the option of the operator. Furthermore, in the case of failure of one engine the other engine can be engaged to continue operation with no noticeable adverse effects.

Because of the advantageous features of the arrangement of the present invention one engine may be a very small horsepowered engine particularly utilized for low fuel consumption at trolling or cruising speeds and the second engine can be a very high horsepowered engine engaged only when full power is required, or the performance of the boat must be increased for a particular result. The arrangement of the present invention with the advantage of having a moveable engine, lends itself particularly to such an application because the two engines would be of different horsepower and would, therefore, be of different weight so that a complicating balancing arrangement would be required if the engines were mounted in side by side relationship in accordance with the present state of the art. It will be noted that when one of the two engines is a small horsepowered engine, gear reduction would be required.

What is claimed is:
1. A multi-engine drive arrangement for a boat hull comprising:
 (a) a first engine disposed in said hull on the keel line of said hull;
 (b) a second engine, weighing more than said first engine disposed in said hull on the keel line of said hull in spaced, aligned, relation with said first engine;
 (c) means to move at least one of said engines along said keel line relative to the other engine; and,
 (d) power transmitting means cooperatively joining said engines to cooperative, selected, hull propulsion means and including gear reduction means joining said first engine to said hull propulsion means, and further including means directly connecting said second engine to said hull propulsion means.

2. The multi-engine drive arrangement of claim 1 wherein said power transmitting means is releasably coupled to at least one of said engines.

3. A multi-engine drive arrangement as in claim 2 wherein said power transmitting means is releasably coupled to said select propulsion means.

4. The multi-engine drive arrangement of claim 1 wherein at least two propulsions means are connected to the said power transmitting means to selectively receive power from said engines.

5. The multi-engine drive arrangement of claim 1 wherein said select propulsion means includes a first propulsion means and a second propulsion means, said first and second propulsion means individually releasably coupled to said power transmitting means.

References Cited

UNITED STATES PATENTS

| | | | |
|---|---|---|---|
| 1,019,283 | 3/1912 | Surcouf. | |
| 1,781,656 | 11/1930 | Day | 115—37 |
| 1,802,931 | 4/1931 | Spear | 115—37 |
| 2,501,617 | 3/1950 | Roesch | 115—37 X |
| 3,155,070 | 11/1964 | Jebens et al. | 115—37 X |

FOREIGN PATENTS 602,632  5/1948  Great Britain.

TRYGVE M. BLIX, *Primary Examiner.*

U.S. Cl. X.R.

114—124